No. 607,149. Patented July 12, 1898.
V. WEBER.
BICYCLE GEARING.
(Application filed Oct. 14, 1897.)
(No Model.) 2 Sheets—Sheet 1.

Witnesses—
J. H. Blusch
C. Johnson

Inventor.
Valentin Weber
By J. M. Thurlow
Atty.

THE NORRIS PETERS CO., PHOTO-LITHO., WASHINGTON, D. C.

No. 607,149. Patented July 12, 1898.
V. WEBER.
BICYCLE GEARING.
(Application filed Oct. 14, 1897.)
(No Model.) 2 Sheets—Sheet 2.

Witnesses—

Inventor—
Valentin Weber
By L. N. Thurlow
ATTY.

UNITED STATES PATENT OFFICE.

VALENTIN WEBER, OF PRINCEVILLE, ILLINOIS.

BICYCLE-GEARING.

SPECIFICATION forming part of Letters Patent No. 607,149, dated July 12, 1898.

Application filed October 14, 1897. Serial No. 655,148. (No model.)

*To all whom it may concern:*

Be it known that I, VALENTIN WEBER, a citizen of the United States, residing at Princeville, in the county of Peoria and State of Illinois, have invented certain new and useful Improvements in Bicycle-Gearing; and I do hereby declare that the following is a full, clear, and exact description of the invention, which will enable others skilled in the art to which it appertains to make and use the same.

This invention relates to speed-changing devices for bicycles.

The object of this invention is to provide a bicycle with a simple gearing which will enable the rider to move with as much ease in climbing hills as upon level roads.

Figure 1:
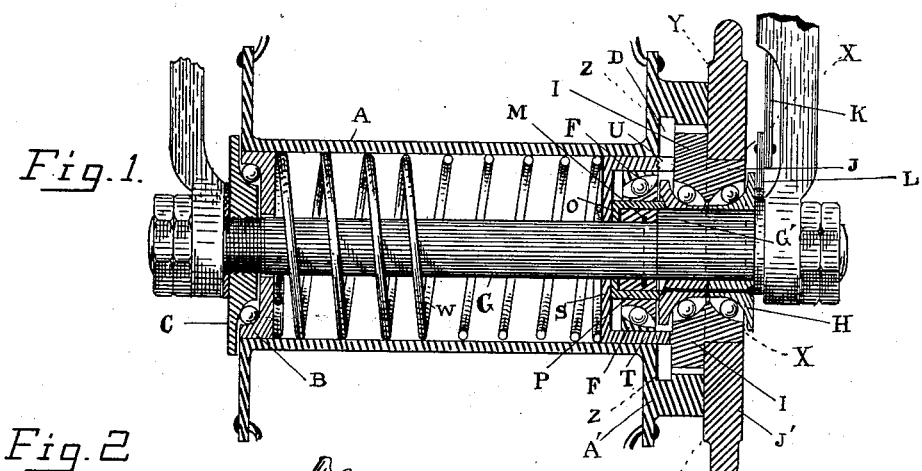
Figure 2:
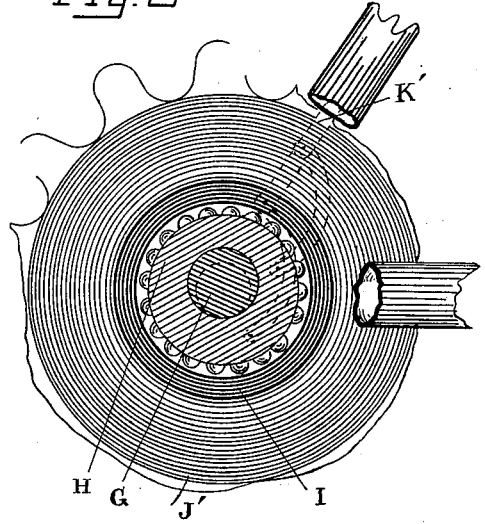
Figure 3:
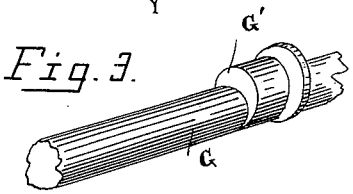
Figure 4:
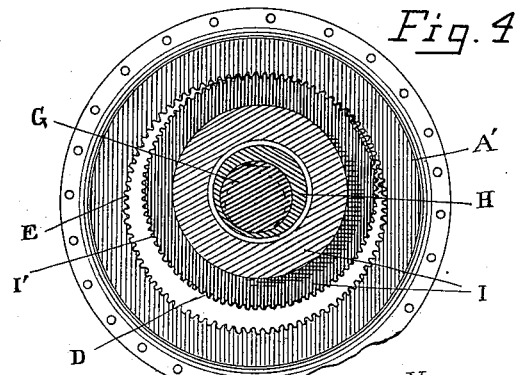
Figure 5:
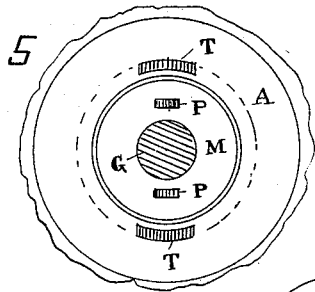
Figure 6:
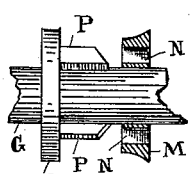
Figure 7:
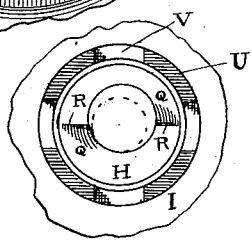
Figure 8:
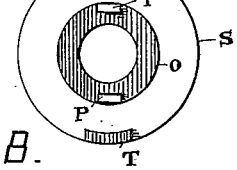
Figure 9:
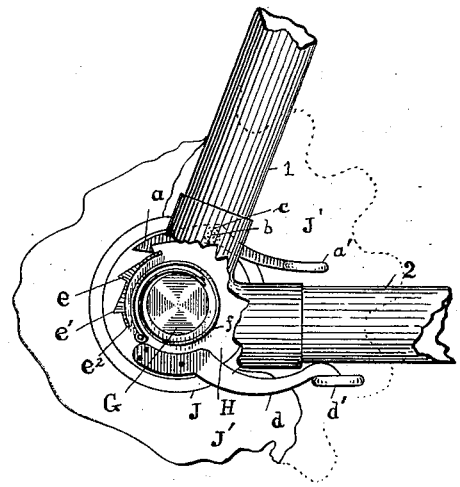
Figure 10:
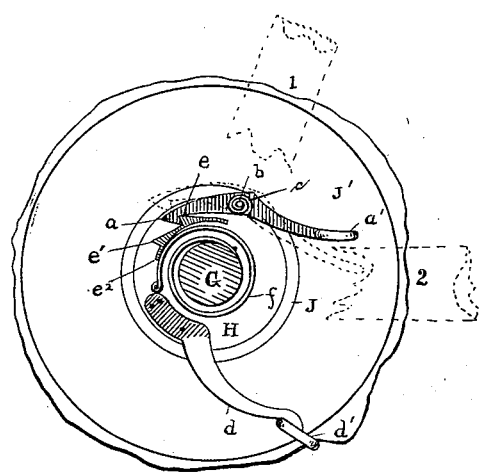

In the drawings herewith, Figure 1 is a longitudinal cross-sectional view of the hub of the rear wheel. Fig. 2 is a transverse section of a shaft and one of its cones on line X X, Fig. 1. Fig. 3 is a perspective view of a portion of the shaft, showing peculiar construction. Fig. 4 is a cross-section of the device through line Y Y, Fig. 1. Fig. 5 is an end view of the inside portion of the hub on line Z Z, Fig. 1. Fig. 6 is a side view of a portion of the shaft, showing a cone thereon and ring carrying two lugs, which form part of the invention. Fig. 7 is a face view of a sleeve, showing depressions in its face, also showing part of a gear-wheel, to which the sprocket is secured. Fig. 8 is a face view of two rings used for disengaging certain parts. Fig. 9 is a face view of a shifting device on the rear wheel for changing the gear by foot. Fig. 10 is a view of the same, showing position for increased speed.

Letters and numerals of reference in the specification and on the drawings correspond.

A represents a hub of a wheel, which is made in tubular form, having a ball-cup B at one end, which is secured in the hub by any good means. The opposite end of the hub is enlarged, as at A', and said enlargement is bored out to form the cavity D. The overhanging enlargement is provided on its inner surface with a series of teeth E. A wall F is made with the hub or set therein and held by suitable means, said wall being bored out to form a ball-cup, as shown in Fig. 1. A shaft G occupies a central position within the hub and is securely held in the extremities of the frame in the usual manner. Upon the end of the shaft corresponding with the end of the hub having the ball-cup B is a cone C, and between said cone and said cup B is a series of balls, as in ordinary practice. The opposite end of the shaft is formed with an eccentrically-arranged enlargement G', which occupies a vertical position with reference to the shaft at all times. Upon this eccentric G' is a cam-sleeve H, made in two portions, having the line of division at right angles to the shaft and held together by bolts or other good means. This cam-sleeve need not necessarily be of two pieces, but may be an integral part, that described herein, however, being formed in two parts to facilitate construction. The outer surface or periphery of this sleeve is grooved, as shown. A gear-wheel I surrounds said sleeve and is bored out at either side to correspond with the groove of the said cam-sleeve H, and two series of balls form bearings between it and the said gear-wheel. The diameter of this gear-wheel is somewhat less than the greatest diameter of the space having the teeth E, so that said gear-wheel may revolve within the cavity D without the teeth I' thereof interfering with the teeth of the enlarged hub, and the gear-wheel is provided with a shoulder J on its outer side, upon which is rigidly secured a sprocket-wheel J'. A shifting rod K passes through the rear upper reach of the frame, and its lower end pivotally supports an arm E, which forms the arc of a circle and whose opposite end is pivoted to the cam-sleeve H, as shown in Fig. 2. Said rod K extends up to a point near the saddle, within easy reach of the rider, and is controlled by an eccentric (not shown) pivoted to the frame to which the end of the rod is secured. This eccentric or other device to answer the same purpose may have three points at which it may be set. For instance, when the rod is down an ordinary high gear is in use for level riding. When the rod is drawn up half-way by the eccentric, the gearing is entirely out of mesh and the machine is then adjusted for coasting. When drawn to its highest limit, the low gear is in use for hill-climbing, all of which will be understood hereinafter.

Upon the straight portion of the shaft behind the eccentric portion G' is a ring M, secured to the shaft and coned on its outer edge to correspond with the coned portion of the wall F, before described, and a series of balls occupy a position within the ball-race thus formed. The said ring M is provided with an opening N on diametrically opposite sides of the shaft, as shown in Fig. 6. Upon the shaft is a ring O, having lugs P to correspond with said openings N, said lugs being beveled on their outer ends in opposite directions to correspond with and lie within the oppositely-placed bevels or depressions Q in the inner surface of the collar H. The depressions Q are formed at either side of the shaft and are made by cutting out the metal on the surface of the sleeve, as shown in Fig. 7, leaving an abrupt shoulder R. The beveled ends of said lugs P correspond with these depressions, as stated above, and at certain times the turning of the sleeve forces the lugs out of the depressions by reason of the bevels. Against the ring O is a ring S, moving freely within the hub A. The said ring is provided at diametrically opposite sides with lugs T, which project through corresponding openings in the wall F. Upon the inner face of the gear-wheel I are a number of teeth U, which stand at right angles with the face of the wheel and in line with the lugs T on the ring S. These teeth revolve within the space D without interference. The space between the teeth is indicated at V, Fig. 7, within which the lugs T lie in practice. An opening coil-spring W within the hub A, between the cup B and the ring S, serves to keep the lugs T in engagement with the teeth U of the gear-wheel.

In the position shown in Fig. 1 the device is in gear for high speed on level roads. For low-speed use the device occupies the position shown in Fig. 4, which is acquired by turning the cam-sleeve upon the shaft by raising the rod K. The lugs T of the ring S by being held within the wall against rotary movement except with the hub drive the said hub because of its being driven by the gear-wheel I, which in turn is driven from the sprocket J, to which it is secured. The ball-bearing formed by the wall F and ring M forms the only bearing for the hub at that end, and which corresponds with the bearing formed by the cup B and cone C at the opposite end. As shown in the several figures, the bore of the sleeve H, within which the enlarged portion G' of the shaft lies, is set off the center in an opposite direction to the position of the enlargement G' on the shaft, so that the straight portion of the shaft proper occupies a central position with reference to the sleeve when the device is in position shown in Fig. 1. When the rider desires to change the speed of his machine for climbing hills, he has merely to cause the rod K to be elevated, as shown by broken lines K' in Fig. 2, thus raising the arm L, which obviously swings the sleeve H upon the shaft a portion of a revolution, when, as shown in Fig. 4, the gear-teeth I are in engagement with the teeth E of the hub, and simultaneous with this operation the lugs P on the ring O are forced out of the depressions Q by the corresponding bevels, as before set out. This latter result must take place because the ring M, through which the lugs pass, being fast to the shaft, prevent said lugs from having a rotary motion. Therefore they are forced out. The ring being shifted longitudinally on the shaft and having the ring S in contact therewith must shift said ring S in the same direction, thus withdrawing the lugs T from engagement with the teeth U, and while the sleeve retains a position on the shaft (shown in Fig. 4) the said teeth U and lugs T are always out of engagement. It must be understood that these portions are thrown entirely out of mesh before the teeth E and I' are engaged, else destruction of parts would be the result. This being the case, also it will be evident that there is a point at which the sprocket-wheel will be free to turn on the shaft, thereby giving the coasting adjustment, all of which has been described. The sprocket J' being in rigid connection with the hub by the lugs T, as in Fig. 1, it may be seen that the speed of the machine would depend on the relative size of the said sprocket J' and the driving-sprocket. When the device is changed for lower gear for climbing hills, Fig. 2, the gear-wheel I, being of smaller diameter than the inside of the enlarged portion A' with the teeth E, it is very evident that the speed will be reduced, thus increasing the power, the driving being imparted to the smaller gear of the two. Any good means may be employed for keeping the rod K in its several positions.

Figs. 9 and 10 show a modification of means for shifting the cam-sleeve upon the shaft and which affords a very simple and effective arrangement which would take the place of the rod K and the arm L. In Fig. 9, 1 and 2 indicate the upper and lower reaches of the frame, respectively, which are broken away at their lower extremities to show portions beyond upon the cam-sleeve. Upon the reach 1 is pivoted a pawl $a$, having a foot-lever extension $a'$. As in Fig. 10, a spiral spring C surrounds the pivot $b$, serving to keep the hooked end downward. Upon the surface of the cam-sleeve are two lugs $e$ and $e'$, which stand above the surface of the sleeve a sufficient height to permit engagement therewith of the said pawl $a$. A raised portion $e$ is also formed upon the face of the sleeve at the base of the said lugs, upon which the point of the pawl is allowed to rest. A spiral spring $f$ surrounds the shaft G, one end being suitably secured to the shaft, the other being made rigid with the cam-sleeve by suitable means. The purpose of the said spring is to return the sleeve to its central or usual position after each movement. A foot-lever $d$ is rigidly secured by any good means to the face of the cam-sleeve, its free outer end resting against the under surface of the reach 2. The position shown in Fig. 9 corresponds with that of Fig. 1. Fig. 10 shows the coasting position, the lever d being thrown downwardly by the pressure of the foot of the rider, thus moving the cam-sleeve upon the eccentric G a portion of a revolution, thereby bringing the lug e into engagement with the pawl a. If the rider wishes to throw his wheel into gear for low speed, he has merely to depress the lever d still farther, thereby bringing the lug e' into engagement with the pawl, at which time the device occupies a position corresponding to Fig. 4. If he desires to return the device to its original position, as in Fig. 9, he has merely to depress the pawl a by means of his foot, which raises same from engagement with the lug, and the sleeve returns to its normal position by reason of the tension of the spiral spring f, surrounding the shaft, the proper stopping-point being reached by the meeting of the lever d with the reach 2. It will be seen in Figs. 9 and 10 that the partial revolution of the sleeve on the shaft is accomplished in an opposite direction to that described and as to the other several figures. This will make no difference in the object accomplished, but simply necessitates the reversing of the depression Q on the end of the cam-sleeve H and the bevels of the lugs P on the ring O. This form of device is superior to that shown in Figs. 1 and 2 for the reason that the rider may use both hands for guiding his machine and may change the speed of the gearing by merely transferring one foot from its pedal to one of the levers and depressing, consuming by that action only a second of time.

Various slight changes in the construction of the parts in my entire device may be made without departing from the spirit of my invention.

Having thus described the device in its entirety, I claim—

1. A gear-changing device for bicycles, consisting of a hollow hub, a shaft within the hub, a suitable ball-bearing at one end for the hub and shaft, an enlarged portion on the opposite end of the shaft to form an eccentric with the straight portion thereof, a ring secured to the straight portion of the shaft, adjacent to the said enlarged portion, a wall F in the hub in the same plane as the said ring, a series of balls between the wall and the ring to form a bearing, to correspond with the bearing at the opposite end of the hub, a cam-sleeve H upon the eccentric portion of the shaft, a gear-wheel surrounding the said cam-sleeve, a series of balls between the said gear-wheel and cam-sleeve to form a bearing, a series of teeth on the side of the gear-wheel, a series of teeth on the inside of the hub, a sprocket-wheel rigidly mounted on said gear-wheel, a shifting ring upon the shaft, lugs on diametrically opposite sides thereof, openings in the wall F for the entrance of said lugs for engagement with the teeth on the side of the gear-wheel, suitable means for giving the said ring longitudinal movement, a spring within the hub in contact with the ring and an operating mechanism for turning the cam-sleeve upon the shaft, all for the purposes set forth and described.

2. A gear-changing device for bicycles consisting of a hollow hub, a shaft within the hub, an enlarged portion at one end of the shaft to form an eccentric with the straight portion thereof, a cam-sleeve upon the said eccentric portion of the shaft, depressions in the end of the said sleeve, a gear-wheel upon the cam-sleeve, a series of teeth on the inside of the hub to engage with the teeth of the gear-wheel, means for shifting the gear-wheel eccentrically upon the shaft to bring the two series of teeth into engagement, teeth U on the side of the gear-wheel, a sprocket-wheel rigidly secured to the gear-wheel, in combination with means for rigidly securing the said gear-wheel to the hub and for its disengagement therefrom, which consists of a shifting ring on the shaft, lugs on the ring for engaging the teeth U of the gear-wheel, a second ring upon the shaft having lugs to engage the depressions in the cam-sleeve, for the purpose herein set forth and described.

3. A gear-changing device for bicycles consisting of a hollow hub, a series of gear-teeth within the the same, a shaft within the hub, suitable bearings between the hub and shaft, an enlarged portion on the shaft eccentric to the straight portion thereof, a cam-sleeve eccentrically mounted on the enlarged portion of shaft, a gear-wheel surrounding the cam-sleeve, a sprocket-wheel mounted on the said gear-wheel, suitable means between the gear-wheel and the wheel-hub for locking these portions together when desired, which consists of a shifting ring upon the shaft, lugs thereon for engaging the gear-wheel, suitable means for shifting the ring upon the shaft for the purposes set forth, in combination with the frame portions supporting the shaft, a series of lugs or teeth on the outer surface of the cam-sleeve, a pawl pivotally secured on one of the frame portions for engagement with the said lugs or teeth, a lever rigidly secured at one end to the cam-sleeve, both pawl and lever adapted to be operated by the foot of the rider, and an operating-spring suitably connected to the shaft and cam-sleeve, all working together substantially in the manner and for the purposes herein set forth and described.

4. A gear-changing device for bicycles consisting of a hollow hub, a shaft therein, suitable bearings between them, an enlarged eccentric portion on the shaft, a cam-sleeve on said eccentric portion, indentations in the cam-sleeve, teeth on the periphery and on the side of the gear-wheel, teeth in the hollow hub to correspond with those on the periphery of said gear-wheel, a sprocket-wheel on the gear-wheel, a foot-lever for moving the cam-sleeve about the shaft, and a clutch for securing same, in combination with the wall F of the hub, a shifting ring on the shaft behind said wall, lugs on the ring for engaging the teeth on the side of the gear-wheel, a second ring bearing against the first, lugs thereon for engaging the indentations in the cam-sleeve all for the purposes set forth.

In testimony whereof I affix my signature in presence of two witnesses.

VALENTIN WEBER.

Witnesses:
C. JOHNSON,
A. KEITHLEY.